(12) United States Patent
Jiang

(10) Patent No.: US 11,270,441 B2
(45) Date of Patent: Mar. 8, 2022

(54) DEPTH-AWARE OBJECT COUNTING

(71) Applicant: Nokia Technologies Oy, Espoo (FI)

(72) Inventor: Xiaoheng Jiang, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/754,988

(22) PCT Filed: Nov. 1, 2017

(86) PCT No.: PCT/CN2017/108952
§ 371 (c)(1),
(2) Date: Apr. 9, 2020

(87) PCT Pub. No.: WO2019/084854
PCT Pub. Date: May 9, 2019

(65) Prior Publication Data
US 2020/0242777 A1    Jul. 30, 2020

(51) Int. Cl.
*G06K 9/00* (2006.01)
*G06T 7/136* (2017.01)

(52) U.S. Cl.
CPC .... *G06T 7/136* (2017.01); *G06T 2207/10028* (2013.01); *G06T 2207/20081* (2013.01);
(Continued)

(58) Field of Classification Search
CPC .................................................. G06T 7/136
See application file for complete search history.

(56) References Cited

U.S. PATENT DOCUMENTS

| | | | |
|---|---|---|---|
| 7,457,436 B2 | 11/2008 | Paragios et al. | |
| 2009/0222388 A1* | 9/2009 | Hua | G06K 9/00778 706/12 |

(Continued)

FOREIGN PATENT DOCUMENTS

| | | |
|---|---|---|
| CN | 102521646 A | 6/2012 |
| CN | 106650913 A | 5/2017 |

(Continued)

OTHER PUBLICATIONS

Zhang et al., "Single-Image Crowd Counting Via Multi-Column Convolutional Neural Network", IEEE Conference on Computer Vision and Pattern Recognition (CVPR), Jun. 27-30, 2016, pp. 589-597.

Sindagi et al., "A Survey of Recent Advances in CNN-based Single Image Crowd Counting and Density Estimation", Pattern Recognition Letters, Jul. 5, 2017, pp. 1-16.

(Continued)

*Primary Examiner* — Oneal R Mistry
(74) *Attorney, Agent, or Firm* — Ditthavong, Steiner & Mlotkowski

(57) ABSTRACT

Methods and apparatus, including computer program products, are provided for depth-aware object counting. In some example embodiments, there may be provided a method that includes processing, by the trained machine learning model, a first segment of an image and a second segment of the image, the first segment being processed using a first filter selected, based on depth information, to enable formation of a first density map, and the second segment being processed using a second filter selected, based on the depth information, to enable formation of a second density map; combining, by the trained machine learning model, the first density map and the second density map to form a density map for the image; and providing, by the trained machine learning model, an output based on the density map. Related systems, methods, and articles of manufacture are also described.

20 Claims, 10 Drawing Sheets

(52) U.S. Cl.
CPC ............... *G06T 2207/20084* (2013.01); *G06T 2207/30196* (2013.01); *G06T 2207/30242* (2013.01)

(56) References Cited

U.S. PATENT DOCUMENTS

| | | | | |
|---|---|---|---|---|
| 2010/0053359 | A1* | 3/2010 | Mooradian | G06K 9/4661 348/222.1 |
| 2013/0182904 | A1* | 7/2013 | Zhang | A61B 5/1073 382/103 |
| 2014/0139633 | A1 | 5/2014 | Wang et al. | |
| 2016/0133025 | A1 | 5/2016 | Wang et al. | |
| 2016/0140399 | A1* | 5/2016 | Yano | G06T 7/593 382/103 |
| 2016/0292492 | A1 | 10/2016 | Amzaleg et al. | |
| 2018/0046858 | A1* | 2/2018 | Chen | G06K 9/00577 |
| 2018/0046877 | A1* | 2/2018 | Chen | G06T 7/11 |
| 2019/0095720 | A1* | 3/2019 | Ju | G06K 9/00778 |

FOREIGN PATENT DOCUMENTS

| | | |
|---|---|---|
| CN | 106778502 A | 5/2017 |
| EP | 2704060 A2 | 3/2014 |
| WO | 2016/183766 A1 | 11/2016 |

OTHER PUBLICATIONS

Han et al., "Image Crowd Counting Using Convolutional Neural Network and Markov Random Field", arXiv, Jun. 12, 2017, pp. 1-6.
Boominathan et al., "Crowdnet A Deep Convolutional Network for Dense Crowd Counting", arXiv, Aug. 22, 2016, 5 pages.
Zeng et al., "Multi-Scale Convolutional Neural Networks for Crowd Counting", arXiv, Feb. 8, 2017, 5 pages.
International Search Report and Written Opinion received for corresponding Patent Cooperation Treaty Application No. PCT/CN2017/108952, dated Aug. 8, 2018, 9 pages.
Office Action for related European Patent Application No. 17930503.2-1210 / 3704558, dated Jun. 8, 2021, 11 pages.
Cao et al., "Crowd counting via region based multi-channel convolution neural network", Proceedings of Spie vol. 10605, Lidar Imaging Detection and Target Recognition 2017, Jul. 23, 2017, 8 pages.
Onoro-Rubio et al., "Towards Perspective-Free Object Counting with Deep Learning", Sep. 16, 2016, pp. 615-629.
Porzi et al., "Depth-Aware Convolutional Neural Networks for Accurate 3D Pose Estimation in RGB-D images", Sep. 24, 2017, 7 pages.
Porzi et al., "Learning Depth-Aware Deep Representations for Robotic Perception", IEEE Robotics and Automation Letters, vol. 2, No. 2, Nov. 2016, pp. 1-8.

* cited by examiner

DEPTH-AWARE OBJECT COUNTING

RELATED APPLICATION

This application claims priority to PCT Application No. PCT/CN2017/108952, filed on Nov. 1, 2017, each of which is incorporated herein by reference in its entirety.

FIELD

The subject matter described herein relates to machine learning.

BACKGROUND

Machine learning technology enables computers to learn tasks. For example, machine learning may allow a computer to learn to perform a task during a training phase. Later, during an operational phase, the computer may be able to perform the learned task. Machine learning may take the form of a neural network, such as a deep learning neural network, a convolutional neural network (CNN), a state vector machine, a Bayes classifier, and other types of machine learning models.

SUMMARY

Methods and apparatus, including computer program products, are provided for depth-aware object counting.

In some example embodiments, there may be provided a method that includes processing, by the trained machine learning model, a first segment of an image and a second segment of the image, the first segment being processed using a first filter selected, based on depth information, to enable formation of a first density map, and the second segment being processed using a second filter selected, based on the depth information, to enable formation of a second density map; combining, by the trained machine learning model, the first density map and the second density map to form a density map for the image; and providing, by the trained machine learning model, an output based on the density map, the output being representative of an estimate of a quantity of objects in the image.

In some variations, one or more of the features disclosed herein including the following features can optionally be included in any feasible combination. The trained machine learning model may receive the image including a plurality of objects, wherein the image is segmented, based on the depth information, into at least the first segment and the second segment. The depth information may be received from another machine learning model trained to output the depth information from the image. The trained machine learning model may include a multicolumn convolutional neural network including a first convolutional neural network and a second convolutional neural network. The first convolutional network may include the first filter. The second convolutional network may include the second filter. The first filter and the second filter each include a convolutional layer. The depth information may indicate the location of the first segment and/or the second segment. The depth information may indicate an object size due to distance from a camera. The depth information may indicate a first filter size of the first filter and a second filter size of the second filter. The trained machine learning model may select, based on the depth information, the first filter size of the first filter and the second filter size of the second filter. The training may be based on reference images, such that the machine learning model trains to learn generation of density maps. The plurality of objects may include a plurality of people, a plurality of vehicles, and/or a crowd of people. The first density map may estimate a density of objects in the first segment. The second density map may estimate a density of objects in the second segment. The density map may estimate a density of objects in the image.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
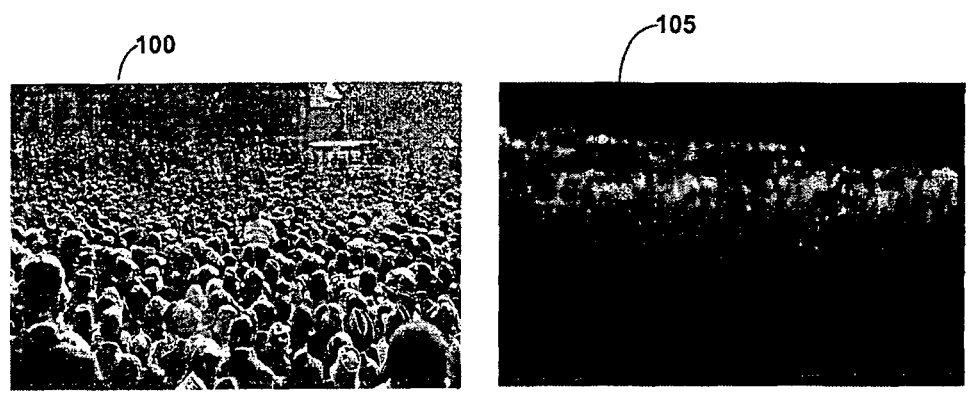
FIG. 1 depicts an example of an image including a crowd of people and a corresponding density map, in accordance with some example embodiments.

Like labels are used to refer to same or similar items in the drawings.

DETAILED DESCRIPTION

Machine learning may be used to perform one or more tasks such as count within at least one image a quantity of objects. For example, a machine learning model, such as a neural network, a convolutional neural network (CNN), a multi-column CNN (MCCNN), and/or other type of machine learning, can be trained to learn how to process at least one image to determine an estimate of the quantity of objects, such as people or other types of objects, in the at least one image (which may be in the form of frames of a video). To illustrate further by way of another example, public safety officials may want to know a crowd count at a given location which can be useful for a variety of reasons including crowd control, restricting the quantity of people at a location, minimizing the risk of a stampede, and/or or minimizing the risk of some other large group related mayhem. To illustrate further by way of another example, traffic safety officials may want to know a count of vehicles on a road (or at a location), and this count may be useful for a variety of reasons including traffic congestion control and management. The trained machine learning model may be used to count objects, such as people, vehicles, or other objects, in at least one image, in accordance with some example embodiments.

When counting objects in an image, the trained machine learning model may provide an actual count of the quantity of objects estimated to be in an image, or may provide a density map providing an estimate of the quantity of objects per square unit of distance, such as quantity of objects per square meter. The density map may provide more information in the sense that the density map may estimate the quantity of objects in the image and the distribution, or density, of objects across the image.

Although some of the examples described herein refer to counting people in images, this is merely an example of the types of objects that can be counted as other types of objects, such as vehicles, and/or the like, may be counted as well.

FIG. 1 depicts an example of an image 100 including objects to be counted 100 and a corresponding density map 105, in accordance with some example embodiments. In the example of FIG. 1, the objects represent people, although as noted the objects may represent other types of objects as well.

The density map 105 may provide information about the objects, such as people, in image 100, such a density of people per square meter, a distribution of people across the image, and/or as a count of the quantity of people in at least a portion of the image. In the crowd counting example, the scale of the objects, such as people, in the image may change due to size (e.g., scale) changes caused by the perspective of the camera in relationship to the people. For example, a person in the foreground of the image 100 may appear larger as that person is closer to the camera, when compared to a similarly sized person in the background and thus farther away from the camera. This perspective caused size variation may affect the accuracy of the count of objects in the at least one image 100 and the accuracy of the corresponding density map 105.

In some example embodiments, a machine learning model, such as a neural network, a CNN, an MCCNN, and/or the like, may be used to determine an estimate of the quantity of objects, such as people, in an image. The estimate may be in the form of a density map of the image. In some example embodiments, the machine learning model may be implemented as an MCCNN, although other types of machine learning models may be used as well. In the case of an MCCNN, crowd counting is described in the paper by Y. Zhang et al., "Single-image crowd counting via multi-column convolutional neural network," Proceedings of the IEEE Conference on Computer Vision and Pattern Recognition. 2016.

In some example embodiments, the density map 105 of an image 100 may be determined by at least segmenting, based on the relative distances of objects such as people from a camera viewpoint, the whole image into at least two regions, although the image may be segmented into other quantities as well (e.g., 3, 4, or more segmented regions). For each segmented region, the machine learning model, such as the MCCNN configured with at least one filter selected to handle the object sizes (e.g., head or people sizes) in the corresponding region, may determine a density map, in accordance with some example embodiments. The density maps for each of the segmented regions may then be combined to form a density map 105 for the whole image 100, in accordance with some example embodiments. Without in any way limiting the scope, interpretation, or application of the claims appearing below, a technical effect of one or more of the example embodiments disclosed herein may be enhanced processing speed due to the segmentation of the images, when compared to processing the whole image, and/or another technical effect of one or more of the example embodiments disclosed herein may be more accurate counting as each segment is processed with a filter specifically to account for the size induced perspective effects for that region and the objects in that region.

Figure 2A:
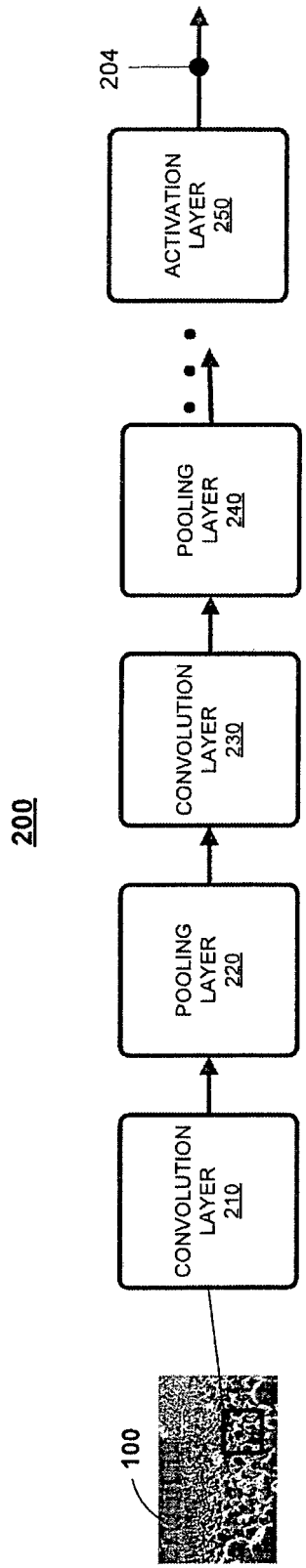
FIG. 2A depicts an example of a convolutional neural network (CNN), in accordance with some example embodiments.

FIG. 2A depicts an example of a CNN 200, in accordance with some example embodiments. The CNN may include at least one convolutional layer 210, 230, at least one pooling layer 220, 240, and a fully connected layer 250.

The convolution layer 210 may be referred to as a filter, and may comprise a matrix that convolves at least a portion of the input image 100. As noted above, the size of this filter, or matrix, may vary in order to detect and filter the object. In this example, a 7 by 7 matrix is selected as the filter at 210 to convolve with image 100, so objects to be counted would need to be less than 7×7 pixels in order to be properly captured (while objects larger than 7×7 would be filtered out). The pooling layer 220 may be used to downsample the convolved image output by the convolution layer 210. To downsample the convolved image into a smaller image, the pooling layer may be formed by a sliding window (or vector) sliding across the convolved image output by the convolution layer 210. The pooling layer may have a stride length representative of the width of the window in pixels. The fully connected layer 250 may generate an output 204.

Figure 2B:
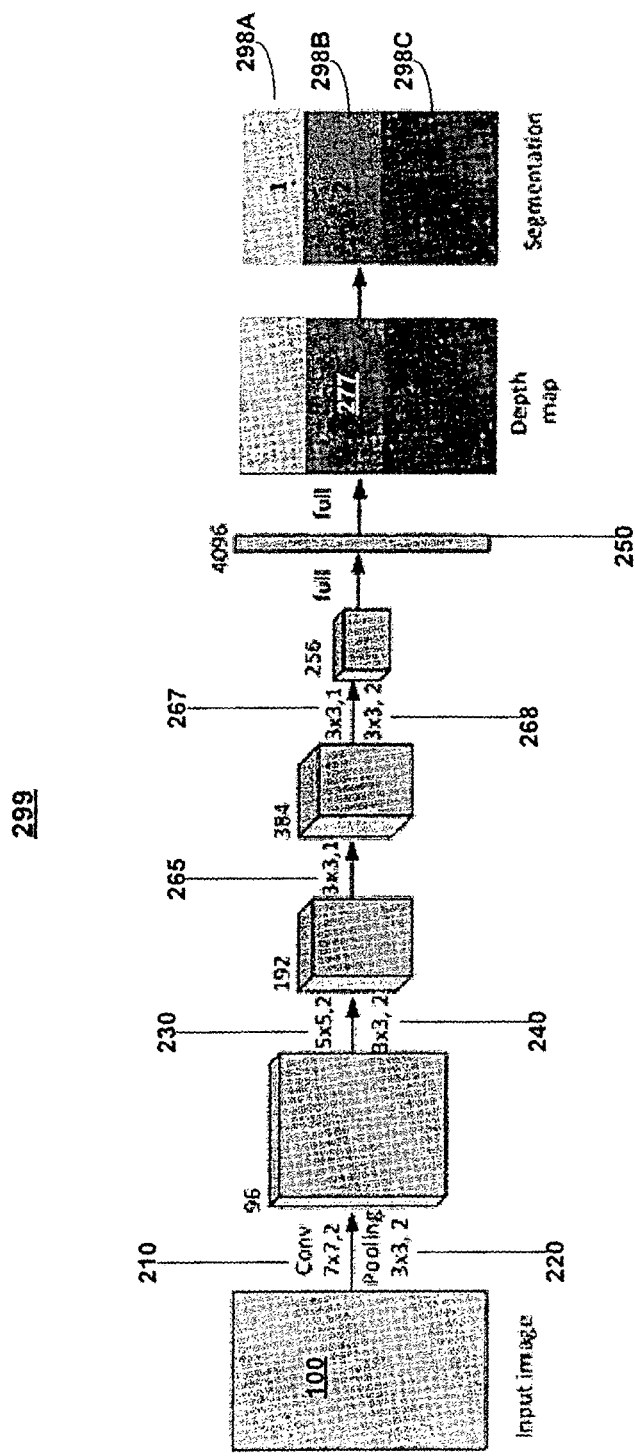
FIG. 2B depicts another example of a CNN, in accordance with some example embodiments.

FIG. 2B depicts another example of a CNN 299, in accordance with some example embodiments. The CNN 299 may be configured to determine how to segment, based on a depth map, an input image. The depth map provides information regarding the relative distances of objects, such as people, heads, and/or the like, from the camera. For example, CNN 299 may determine, based on the depth map 277, segments 298A-C for the input image 100. The size based effects of perspective in a given segment may be the same or similar, so the filter convolving the segment may be better able to detect the object of interest, such as the heads, people, and/or the like.

In the example of FIG. 2B, the CNN 299 may be trained to determine a depth map 277, in accordance with some example embodiments. The depth map 277 may, as noted, provide an indication of the relative distances of objects (e.g., people, heads, and/or the like) from the camera. As such, the depth map may provide an indication of the perspective caused size differences in the image. In the depth map 277, objects farther away from the camera may have pixels that are brighter, when compared to objects that are closer to the camera. As such, the depth map 277 may be used to segment, based on the perspective based size differences, the image 100 into two or more segmented regions, such as 298A-C. Although the previous example uses a depth map having brighter pixels for objects farther away, the pixels may be darker or have other values to signify depth.

To illustrate further, the first segmented region 298A may have objects appearing smaller in size (due to perspective), when compared to the second segmented region 298B. And, the second segmented region 298B may have objects appearing smaller in size (due to the perspective), when compared to the third segmented region 298C. Although the previous example segmented image 100 into three segments, other quantities of segments may be used as well.

In some example embodiments, the CNN 299 may be trained using reference images. These reference images may include objects, such as people in a crowd, and labels indicating the segments determined a priori based on relative size differences caused by perspective. Moreover, these segments of the reference images may correspond to certain sized objects in each of the segments and, as such, corresponding filter sizes. The CNN may then be trained until the CNN can learn to segment the reference images, which may also dictate the filter size to be used for that segment. Once trained, the trained CNN 299 may be used to determine the segments in other input images, in accordance with some example embodiments. In some example embodiments, the training of the CNN In the example of FIG. 2B, the CNN 299 may include a 7×7 convolutional layer 210 (which is the initial filter layer), followed by a 3×3 pooling layer 220, followed by a 5×5 convolutional layer 230, followed by a 3×3 pooling layer 240, followed by a 3×3 convolution layer 265, followed by a 3×3 convolutional layer 267, followed by a 3×3 pooling layer 268, and then coupled to a fully connected layer 250 (also referred to as an activation layer). The fully connected layer may generate an output, which in this example is a depth map 277. Although the CNN 299 is depicted as having a certain configuration of layers, other types and quantities of layers may be implemented as well to provide machine learning that generates the depth map 277 and associated segments 298A-C. In some example embodiments, one or more thresholds may be used to form segments 298A-C. For example, pixels brighter than a certain threshold value may be assigned to segment 298A, while pixels darker than a certain threshold may be assigned to segment 298C. Moreover, each of the segments 298A-C may, as noted, have a certain size object and thus map to a given size of filter at 410A, 410B, and 410C as explained below with respect to FIG. 4.

Figure 3A:
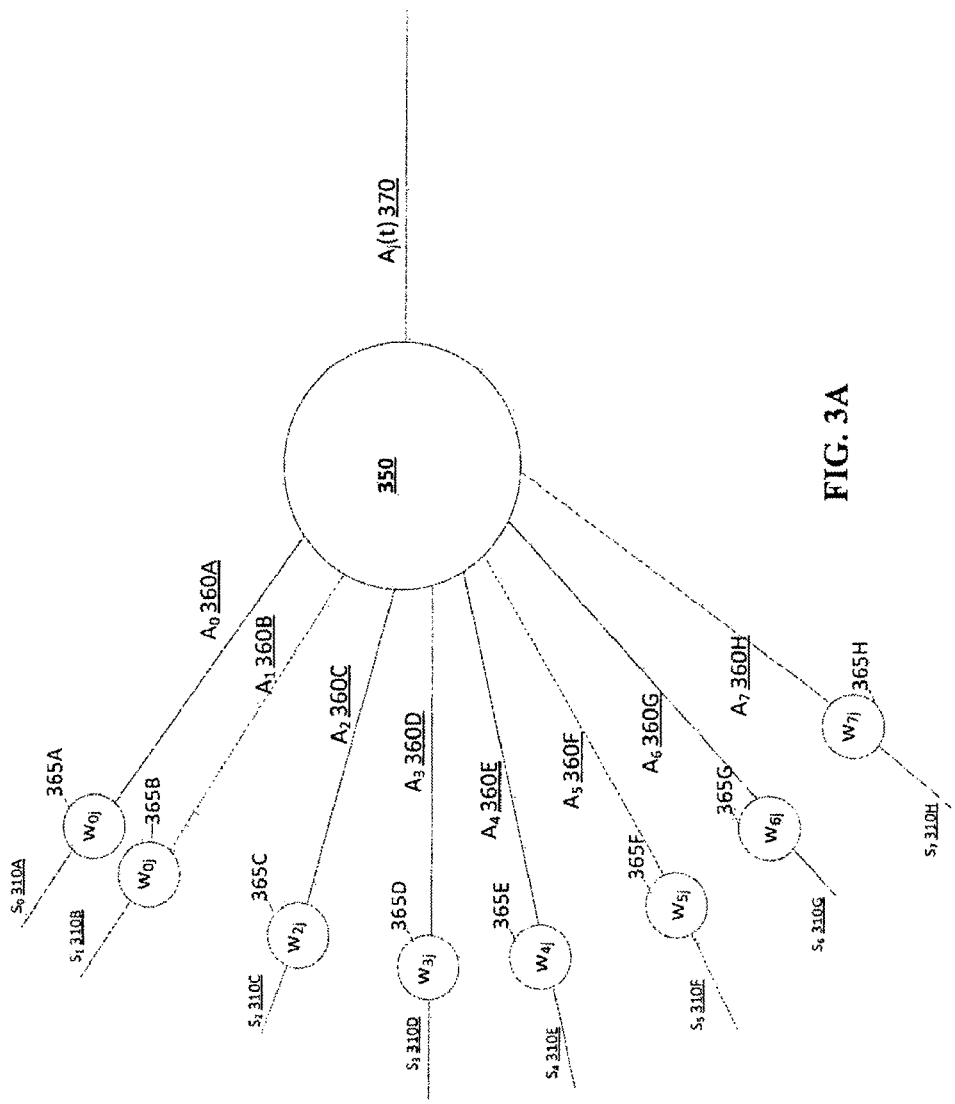
FIG. 3A depicts an example of a neuron for a neural network, in accordance with some example embodiments.

FIG. 3A depicts an example of an artificial neuron Aj 350 which may be implemented in a neural network, such as a CNN, an MCCNN, and/or the like, in accordance with some example embodiments. It will be appreciated that FIG. 3A represents a model of an artificial neuron 350, and the neuron 350 can have other configurations including quantities of inputs and/or quantities of outputs. For example, the neuron 350 may include a plurality of inputs to receive the pixel related values of an image.

Referring to FIG. 3A, the neuron 350 may generate an output $A_j(t)$ 370 based on activation values $A_i(t-1)$ (which correspond to $A_0$-$A_7$) 360A-H, connection weights $w_{ij}$ 365A-H (which are labeled $w_{oj}$ through $w_{7j}$), and input values 310A-H (labeled $S_0$-$S_7$). At a given time, t, each one of the activation values 360A-H may be multiplied by one of the corresponding weights 365A-H. For example, connection weight $w_{oj}$ 365A is multiplied by activation value $A_0$ 360A, connection weight $w_{ij}$ 365B is multiplied by activation value $A_1$ 360B, and so forth. The products (i.e., of the multiplications of the connections and activation values) are then summed, and the resulting sum is operated on by a basis function K to yield at time t the output $A_j(t)$ 370 for node $A_j$ 350. The outputs 370 may be used as an activation value at a subsequent time (e.g., at t+1) or provided to another node.

The neuron 350 may be implemented in accordance with a neural model such as:

$$A_j(t) = K\left[\sum_{i=0}^{n} A_i(t-1) * W_{ij}\right],$$ Equation 1 wherein K corresponds to a basis function (examples of which include a sigmoid, a wavelet, and any other basis function), $A_j(t)$ corresponds to an output value provided by a given neuron (e.g., the $j^{th}$ neuron) at a given time t, $A_i(t-1)$ corresponds to a prior output value (or activation value) assigned to a connection i for the $j^{th}$ neuron at a previous time t−1, $w_{ij}$ represents the $i^{th}$ connection value for the $j^{th}$ neuron, wherein j varies in accordance with the quantity of neurons, wherein the values of i vary from 0 to n, and wherein n corresponds to the number of connections to the neuron.

Figure 3B:
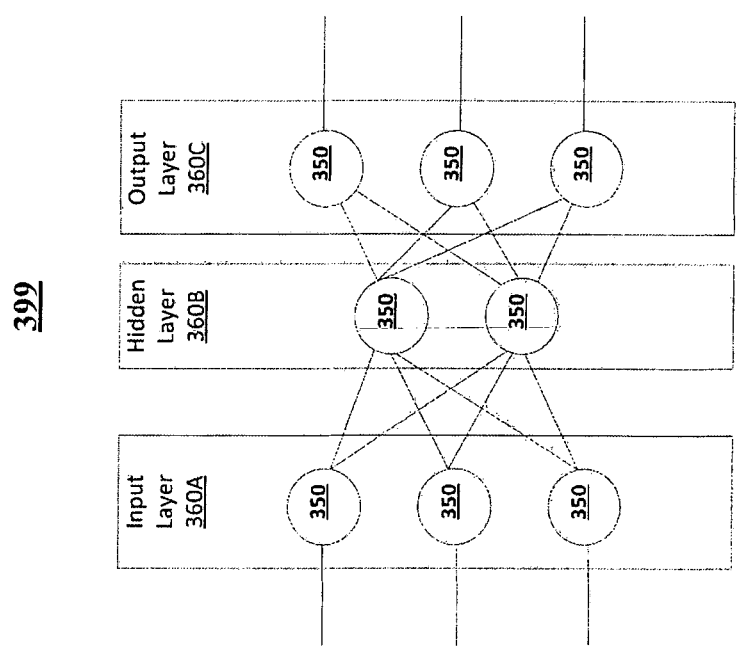
FIG. 3B depicts an example of a neural network including at least one neuron, in accordance with some example embodiments.

FIG. 3B depicts interconnected neurons 350 forming a neural network 399, in accordance with some example embodiments. The neural network 399 may be configured to provide a CNN, such as CNNs 200, 299, an MCCNN, or portions, such as layers of a neural network (e.g., convolutional layer 210 may be implemented using a plurality of interconnected neurons 350). The neuron 350 including the neural network 399 may be implemented using code, circuitry, and/or a combination thereof. In some example embodiments, the neuron 350 and/or the neural network 399 (which includes the neurons 350) may be implemented using specialized circuitry including, for example, at least one graphics processing unit (GPU, which is configured to better handle parallel processing, matrix operations, and/or the like when compared to a traditional central processing unit) or dedicated neural network circuitry.

In the example of FIG. 3B, the neural network 399 may include an input layer 360A, one or more hidden layers 360B, and an output layer 360C. Although not shown, other layers may be implemented as well, such as a pooling layer. It will be appreciated that the neural network's 3-2-3 node structure is used to facilitate explanation and, as such, the neural network 399 may be structured in other configurations, such as a 3×3 structure (with or without hidden layer(s)), a 5×5 structure (with or without hidden layer(s)), a 7×7 structure (with or without hidden layer(s)), and/or other structures (with or without hidden layer(s)) as well.

During training of a neural network, such as neural network 399, training data, such as reference images with labels (e.g., indicating segments, depth maps, crowd counts, and/or the like), may be fed as an input to the input layer 360A neurons over time (e.g., t, t+1, etc.) until the neural network 399 learns to perform a task. In the example of FIG. 3B for example, the CNN 399 may receive labeled training data, such as reference images with the proper segments labeled, so that the CNN 299 can train iteratively until it learns to form a depth map and/or segments for images. To illustrate further, the neurons of the network may learn by optimizing to a mean square error (e.g., between the labeled training data at the input layer 360A and what is generated at the output of the output layer 360C) using gradient descent and/or the like. When the neural network is trained, the neural network's configuration, such as the values of the weights, activation values, basis function, and/or the like, can be saved to storage. This saved configuration represents the trained neural network.

Figure 4:
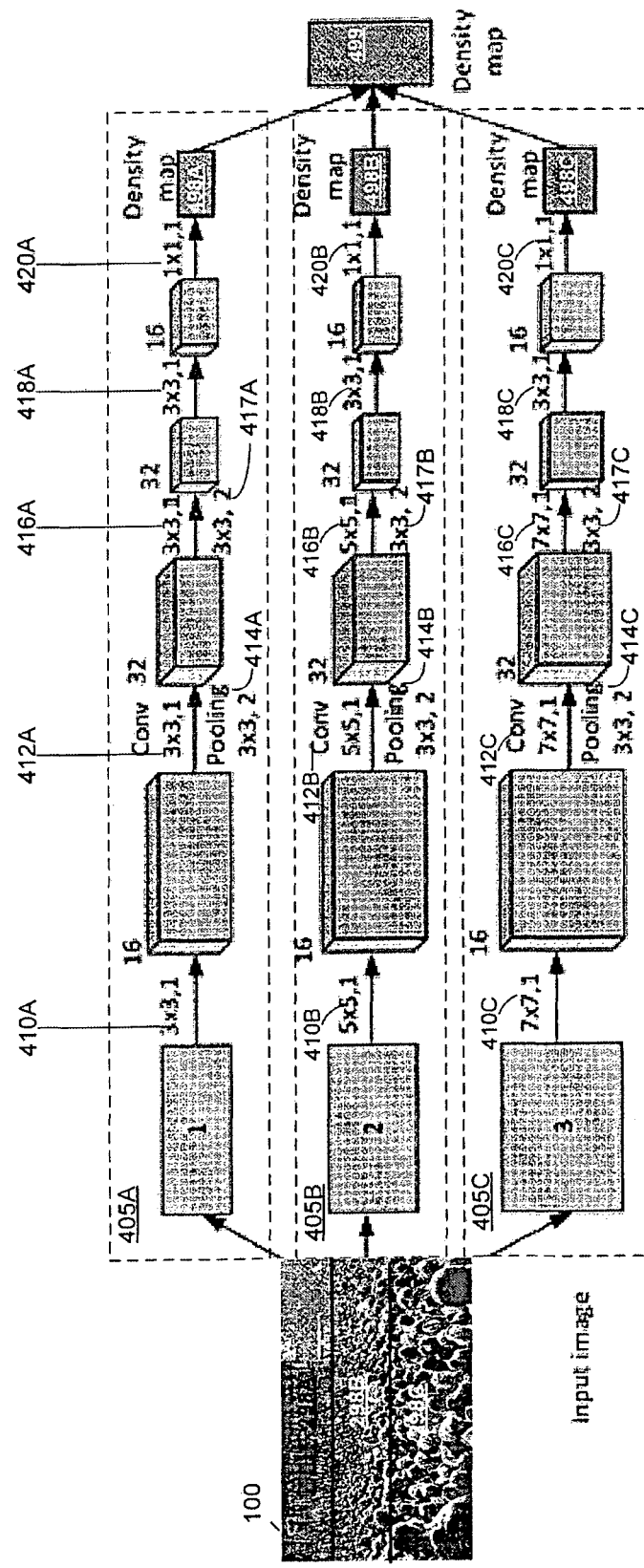
FIG. 4 depicts a multicolumn convolutional neural network (MCCNN), in accordance with some example embodiments.

Referring again to FIG. 2B, the CNN 299 may be used to segment image 100 into regions 298A-C. As noted above, each of the segmented regions 298A-C may have about the same size object (e.g., head or people size), and thus map to a given size of filter at 410A, 410B, and 410C. Moreover, the segmented regions 298A-C (and/or filter sizes for the regions) may be provided to another machine learning model, such as an MCCNN 400 as shown in FIG. 4, in accordance with some example embodiments.

In accordance with some example embodiments, the MCCNN 400 may include a CNN 405A-C for each of the regions segmented in the image. In the example of FIG. 4, there are three segmented regions 298A-C, so there are three columns in the MCCNN, each column including a corresponding one of the CNNs 405A-C.

The first CNN 405A may include a first convolutional layer 410A providing a filter of for example 3×3 pixels. This filter may be selected based on the size of the objects in the segmented region 298A. As noted above, the segmented region 298A may have about the same size objects (e.g., head or people size), so segmented region 298A may map to the filter size of 3×3 pixels at 410A, for example. In other words, the depth information defining where the segments are in image 100 may also enable MCCNN to select the proper filter size for each segment 298A-C. The first convolutional layer 410A may be followed by a convolutional layer 412A, a pooling layer 414A, a convolutional layer 418A, a pooling layer 417A, a convolutional layer 418A, and a fully connected layer 420A. Although the first CNN 405A includes a certain configuration of intermediate layers 412A-418A, other types and/or quantities of layers may be implemented as well.

The second CNN 405B may include a first convolutional layer 410B providing a filter of for example 5×5 pixels. This 5×5 pixel filter may be selected based on the size of the objects in the segmented region 298B. As noted above with respect to filter 410A, the segmented region 298B may have about the same size object (e.g., head or people size), so segmented region 298B may map to the filter size of 5×5 pixels at 410B, for example. The first convolutional layer 410B may be followed by a convolutional layer 412B, a pooling layer 414B, a convolutional layer 418B, a pooling layer 417B, a convolutional layer 418B, and a fully connected layer 420B. Although the second CNN 405B includes a certain configuration of intermediate layers 412B-418B, other types and/or quantities of layers may be implemented as well.

The third CNN 405C may include a first convolutional layer 410C providing a filter of for example 7×7 pixels. This filter may be selected based on the size of the objects in the segmented region 298C. The segmented region 298C may also have about the same size objects (e.g., head or people sizes), so segmented region 298C may map to the filter size of 7×7 pixels at 410C, for example. In other words, the depth information defining where the segments are in image 100 may also enable selection of the proper filter size for each segment. The first convolutional layer 410C may be followed by a convolutional layer 412C, a pooling layer 414C, a convolutional layer 418C, a pooling layer 417C, a convolutional layer 418C, and a fully connected layer 420C. Although the third CNN 405C includes a certain configuration of intermediate layers 412C-418C, other types and/or quantities of layers may be implemented as well.

In accordance with some example embodiments, the MCCNN 400 (which in this example includes 3 CNN columns) may include the first CNN 405A may have the filter 410A which samples a first segmented region 298A and outputs a first density map 498A for the first region, the second CNN 405B may have the filter 410B which samples the second segmented region 298B of the image and outputs a second density map 498B for the second region, and the third CNN 298C may have the filter 410C which samples the second segmented region 298C of the image and outputs a third density map 498C for the third region. To generate the 499 density map for the entire image 100, the first density map 498A, the second density map 498B, and the third density map 498C may be combined, in accordance with some example embodiments. The density map 499 may, as noted, provide an estimate of the quantity of objects per square unit of distance, from which the quantity of objects in the image and the distribution of the objects across the image can be determined. In this example, the objects are people, although other types of object may be counted in the image as well.

In some example embodiments, the filters 410A-C in each of the column CNNs 405A-C may, as noted, be selected based on the size of the objects in the corresponding region and, in particular, the size induced perspective differences in the image. For example, in a given segmented region 298A-C of the image, the size of the people (or their heads) may have the same of similar perspective and thus the same or similar size. As such, the filter 410A for the first CNN 405A may be a smaller filter to take into account the similar people/head sizes in the region 298A farther away from the camera, when compared to the filter 410B for region 298B which is closer to the camera (and thus would require a larger filter). Likewise, the filter 410B for the second CNN 405B handling the region 298B may be a smaller filter, when compared to the filter 410C for the third CNN 405C handling the region 298C. In this way, the MCCNN 400 may select the filters at 410A-C based on the depth information for each of the three regions 298A-C, and each region may be processed using one of the corresponding column CNNs 405A, B, or C configured specifically for the approximate size of the object (e.g., heads or people) in the corresponding region. The MCCNN 400 may thus select, based on the depth information indicative of the segment and object size in the segment, the size of the corresponding initial filter 410A, B, or C, so that the objects in the region can pass through the corresponding filter.

In some example embodiments, the MCCNN 400 may be trained using a reference set of images. These reference images may include reference images having been segmented and having known density maps for each of the segments. Reference images may represent ground truth in the sense that the quantity of people in (or the density map for) the image(s) (or segment(s)) may be known to a certain degree of certainty. The MCCNN 400 may then be trained until the MCCNN can learn to generate a density map for the reference images. Once trained, the trained MCCNN may be used to determine density maps for other input images, in accordance with some example embodiments.

Referring again to FIG. 1, the image 100 (which is being processed to determine an object count) may represent a video stream captured by at least one camera, such as an omnidirectional, or multi-view, camera and/or the like. An example of an omnidirectional, multi-view camera is the Nokia OzO camera, which may generate 360 panoramic images in multiple planes. In the case of the omnidirectional, multi-view camera, the images from the camera can be input to the CNN 299 and/or MCCNN 400 in order to enable generation of a density map and a corresponding crowd count in each image. To illustrate further, the OzO camera may include a plurality of cameras, and the images from each of these cameras can be processed to enable segmentation and/or determine a density map from which a crowd count can be determined. Referring to FIG. 4, each camera of an OzO camera may be input into a separate CNN of the MCCNN and then the output density maps may be combined to form an aggregate density map 499.

Figure 5A:
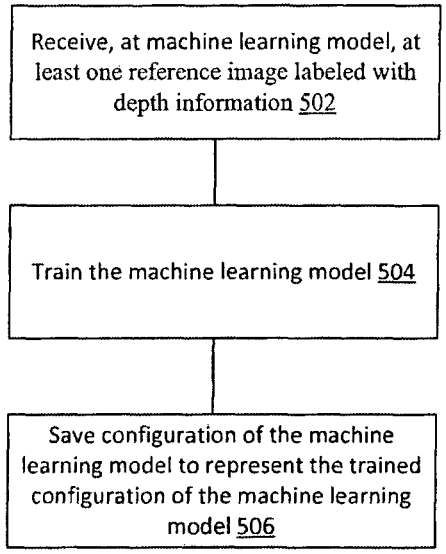
FIGS. 5A-5D depict process flows for determining an object count, in accordance with some example embodiments.

FIG. 5A depicts a process flow for training a machine learning model, such as CNN 299 to learn how to generate depth information, such as depth maps, to enable image segmentation, in accordance with some example embodiments. The description of FIG. 5A refers to FIGS. 1 and 2B.

At 502, at least one reference image may be received labeled with depth information, in accordance with some example embodiments. For example, the CNN 299 may receive reference images having labels indicating the depth of each image. To illustrate further, each reference image may have a corresponding depth map and/or the location of the segments within the image. The objects in the segments in the reference image(s) may be about the same distance from the camera and, as such, have about the same size to enable filtering with the same size filter.

At 504, a machine learning model may be trained to learn based on the received reference images, in accordance with some example embodiments. For example, the CNN 299 may train, based on the receive images, to learn how to generate the depth information, such as the depth map, the location of the segments for received reference images, and/or size of the objects (or filter size) for each segment. The training may be iterative using gradient descent and/or like. When the CNN is trained, the CNN's configuration (e.g., values of the weights, activation values, basis function, and/or the like) may be saved at 506, to storage, in accordance with some example embodiments. This saved configuration represents the trained CNN, which can be used, in an operational phase, to determine depth information, such as depth maps, segments, for images other than the reference images, and/or size of the objects (or filter size) for each segment.

Figure 5B:
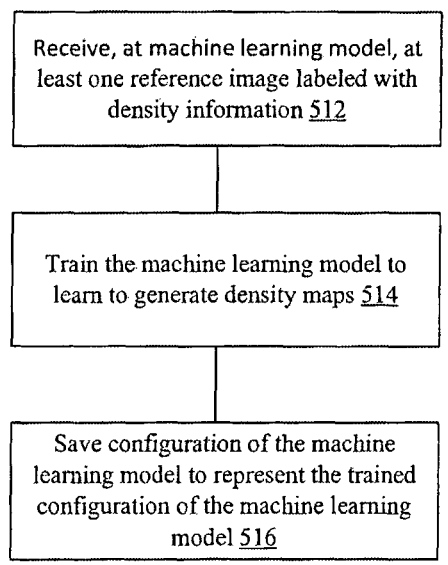

FIG. 5B depicts a process flow for training a machine learning model, such as an MCCNN to provide object count information, in accordance with some example embodiments. The description of FIG. 5A refers to FIGS. 1 and 4.

At 512, at least one reference image may be received labeled with density information, in accordance with some example embodiments. For example, the MCCNN 400 may receive reference images having labels indicating the segments in each image, and a density of the objects, such as people/heads per square meter, object count, and/or the like, in the segment. For example, the reference image 100 (FIG. 4) may be segmented a priori and each segment may have a corresponding density map to enable training. Moreover, each of the segments may have about the same size objects (with respect to perspective), so a given filter can be used on the objects in the corresponding segment.

At 514, a machine learning model may be trained to learn to determine density maps, in accordance with some example embodiments. For example, the MCCNN 400 may train based on the receive reference images to learn how to generate the object density information, such as a density map, count, and/or the like. In some example embodiments, each column CNN 405A-C of the MCCNN may be trained using a first convolutional layer having a filter selected specifically to account for the size induced perspective effects of that region being handled by the column CNN. When the MCCNN is trained, the MCCNN's configuration (e.g., values of the weights, activation values, basis function, and/or the like) may be saved at 516, to storage, in accordance with some example embodiments. This saved configuration represents the trained MCCNN, which can be used, in an operational phase, to determine density information, such as depth maps and segments, for images other than the reference images.

Figure 5C:
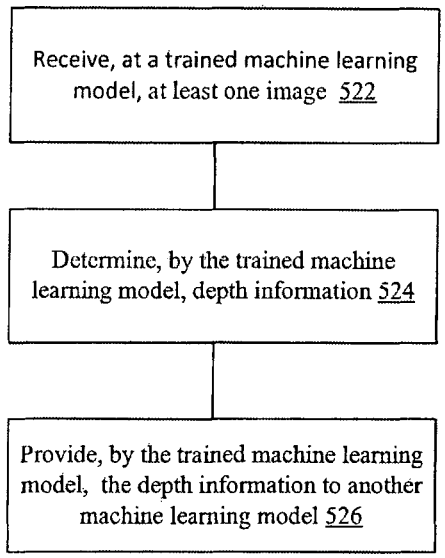

FIG. 5C depicts a process flow for a trained machine learning model in an operational phase, in accordance with some example embodiments. The description of FIG. 5A refers to FIGS. 1 and 2B.

At 522, at least one image may be received by the trained machine learning model, in accordance with some example embodiments. For example, the trained CNN 299 may receive at least one image 100 requiring an estimate of an object count. The trained CNN may process the at least one input image 100 to determine, at 524, depth information, which may be in the form of a depth map, and/or an indication of where the at least one image should be segmented, in accordance with some example embodiments. The depth information may also indicate the size of the objects in the segment(s) and/or the corresponding filter size for the segment(s). At 526, the trained machine learning model, such as the trained CNN 299, may output depth information to another machine learning model, such as the MCCNN 400, in accordance with some example embodiments.

Figure 5D:
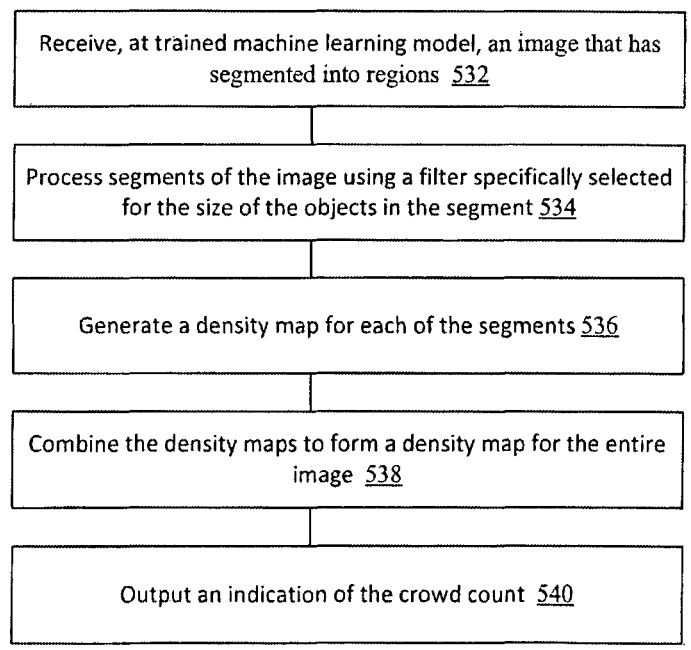

FIG. 5D depicts a process flow for a trained machine learning model in an operational phase, in accordance with some example embodiments. The description of FIG. 5A refers to FIGS. 1 and 4.

At 532, at least one image may be received by the trained machine learning model, in accordance with some example embodiments. For example, the trained MCCNN 400 may receive at least one image. Moreover, the image may be received with depth information to enable segmentation of the image 100 into a plurality of portions. In the example of FIG. 4, the image 100 is segmented into 3 portions 298A-C, although other quantity of segments may be used as well. Moreover, the depth information may enable the MCCNN to select a filter at 410A-C that is sized to process the size of objects found in each of the segments 298A-C.

Each segmented region 298A-C may be processed, at 534, by a CNN 405A-C of the MCCNN 400, in accordance with some example embodiments. Specifically, the segments may be segmented, based on depth information, to take into account the perspective induced size differences. This enables each of the CNN's 405A-C to have a filter better suited for the size of the objects, such as heads, people, and/or the like, in the corresponding segment being handled by the corresponding CNN. For example, the CNN 405A includes objects in the background (which causes objects to appear smaller due to perspective), so the convolutional layer's 410A filter is, for example, a 3×3 matrix to accommodate the relatively smaller sized heads and/or people. As noted above, the size of the filter (which in this example is 3×3) may be selected to pass the object of interest, which are people in this example. By comparison, the CNN 405C has objects in the foreground (which causes objects to appear larger due to perspective), so the convolutional layer's 410C filter is for example, a 7×7, matrix to accommodate the relatively larger sized heads and/or people.

At 536, the trained machine learning model may generate a density map for each segmented region of the image, in accordance with some example embodiments. As shown at FIG. 4, each column CNN 405A-C generates a density map 498A-C.

At 538, the trained machine learning model may combine the density maps for each region to form a density map for the entire image received at the input, in accordance with some example embodiments. For example, the MCCNN 400 may combine the density maps 498A-C into density map 499, which represents the density map 499 for the entire image 100.

At 540, a trained machine learning model may output an indication of the object count, in accordance with some example embodiments. For example, the MCCNN 400 may output the density map 499 or further process the density map to provide a count, such people count, for the entire image or a count for a portion of the image.

Figure 6:
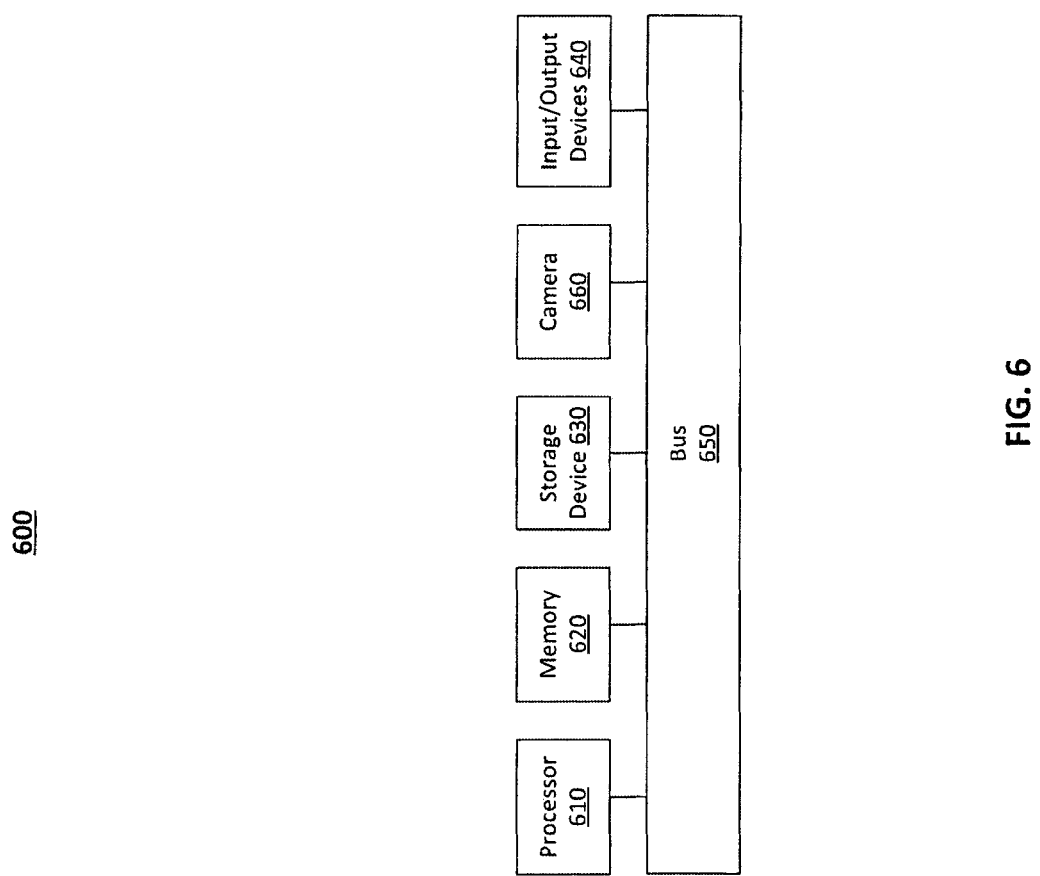
FIG. 6 depicts an example of an apparatus, in accordance with some example embodiments.

FIG. 6 depicts a block diagram illustrating a computing system 600, in accordance with some example embodiments. The computing system 600 may be used to implement machine learning models, such as CNN 200, CNN 299, MCCNN 400, and/or the like as disclosed herein including FIGS. 5A-5D to perform counting of objects in images, in accordance with some example embodiments. For example, the system 600 may comprise, or be comprised in, an apparatus, such as a mobile phone, smart phone, camera (e.g., OzO, closed circuit television, webcam), drone, self-driving vehicle, car, unmanned aerial vehicle, autonomous vehicle, and/or Internet of Things (IoT sensor, such as a traffic sensor, industrial sensor, and/or the like) to enable counting of objects, in accordance with some example embodiments.

As shown in FIG. 6, the computing system 600 can include a processor 610, a memory 620, a storage device 630, input/output devices 640, and/or a camera 660 (which can be used to capture images including objects to be counted in accordance with some example embodiments). The processor 610, the memory 620, the storage device 630, and the input/output devices 640 can be interconnected via a system bus 650. The processor 610 may be capable of processing instructions for execution within the computing system 600. Such executed instructions can implement one or more aspects of the machine learning models, such as CNN 200, CNN 299, MCCNN 400, and/or the like. The processor 610 may be capable of processing instructions stored in the memory 620 and/or on the storage device 630 to display graphical information for a user interface provided via the input/output device 640. The memory 620 may be a computer readable medium such as volatile or non-volatile that stores information within the computing system 600. The memory 620 can store instructions, such as computer program code. The storage device 630 may be capable of providing persistent storage for the computing system 600. The storage device 630 can be a floppy disk device, a hard disk device, an optical disk device, or a tape device, or other suitable persistent storage mechanism. The input/output device 640 provides input/output operations for the computing system 600. In some example embodiments, the input/output device 640 includes a keyboard and/or pointing device. In various implementations, the input/output device 640 includes a display unit for displaying graphical user interfaces. Alternatively or additionally, the input/output device 640 may include wireless and/or wired interface to enable communication with other devices, such as other network nodes. For example, the input/output device 640 can include an Ethernet interface, a WiFi interface, a cellular interface, and/or other wired and/or wireless interface to allow communications with one or more wired and/or wireless networks and/or devices.

Figure 7:
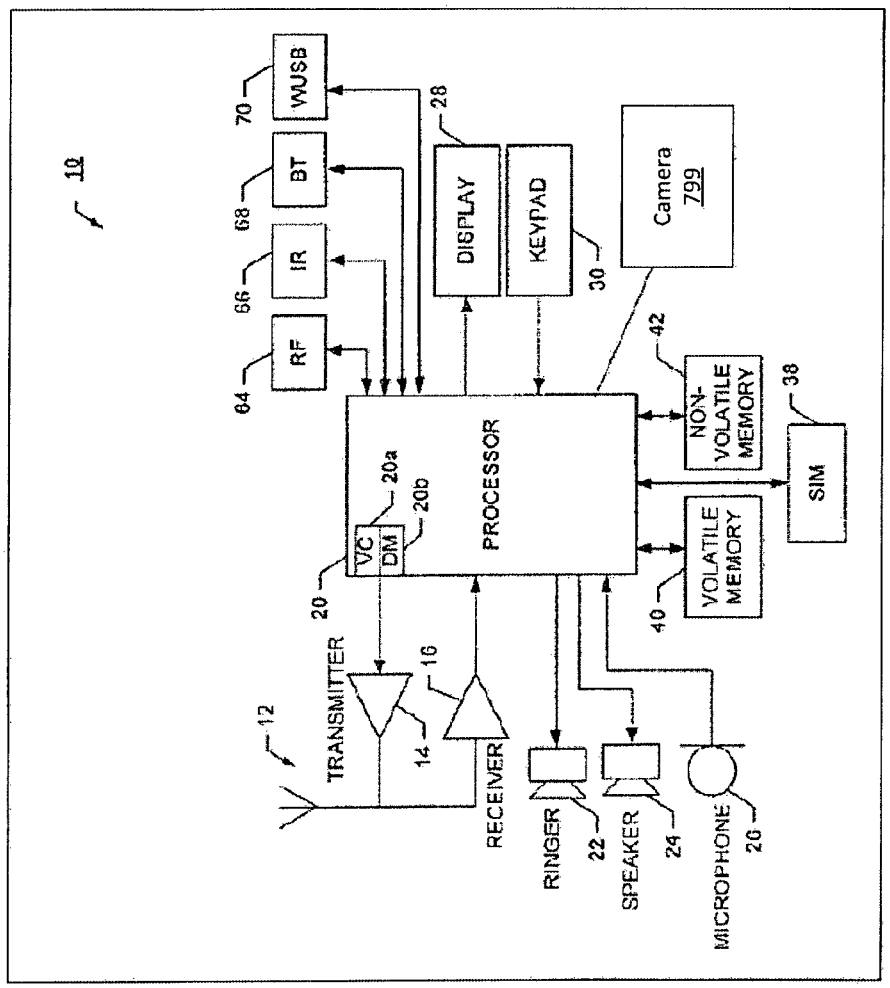
FIG. 7 depicts another example of an apparatus, in accordance with some example embodiments.

FIG. 7 illustrates a block diagram of an apparatus 10, in accordance with some example embodiments. The apparatus 10 may represent a user equipment, such as a wireless device examples of which include a smartphone, a tablet, and/or the like. The apparatus 10 may be used to implement machine learning models, such as CNN 200, CNN 299, MCCNN 400, and/or the like as disclosed herein including FIGS. 5A-5D to perform counting of objects in images, in accordance with some example embodiments. Moreover, the apparatus 10 may include a camera 799, and the processor 20 may comprise GPU or other special purpose processor to handle the processing of the machine learning models. Like the system at FIG. 6, the apparatus 10 may comprise, or be comprised in, an apparatus, such as a mobile phone, smart phone, camera (e.g., OzO, closed circuit television, webcam), drone, self-driving vehicle, car, unmanned aerial vehicle, autonomous vehicle, and/or Internet of Things (IoT sensor, such as a traffic sensor, industrial sensor, and/or the like) to enable counting of objects, in accordance with some example embodiments.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 7 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 7, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including, for example, processing, by the trained machine learning model, a first segment of an image and a second segment of the image, the first segment being processed using a first filter selected, based on depth information, to enable formation of a first density map, and the second segment being processed using a second filter selected, based on the depth information, to enable formation of a second density map; combining, by the trained machine learning model, the first density map and the second density map to form a density map for the image; providing, by the trained machine learning model, an output based on the density map, the output being representative of an estimate of a quantity of objects in the image, and/or other aspects disclosed herein with respect to the CNN, MCCNN 400, and/or the like for counting of objects in images.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein (see, for example, process 600, 700, and/or other operations disclosed herein). For example, the processor 20 may be configured using computer code stored at memory 40 and/or 42 to at least including, for example, processing, by the trained machine learning model, a first segment of an image and a second segment of the image, the first segment being processed using a first filter selected, based on depth information, to enable formation of a first density map, and the second segment being processed using a second filter selected, based on the depth information, to enable formation of a second density map; combining, by the trained machine learning model, the first density map and the second density map to form a density map for the image; and/or other aspects disclosed herein with respect to the CNN, MCCNN 400, and/or the like for counting of objects in images.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 7, computer-readable medium may comprise a non-transitory computer-readable storage medium that may be any media that can contain or store the instructions for use by or in connection with an instruction execution system, apparatus, or device, such as a computer.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. A method comprising:
processing, by a trained machine learning model, a first segment of an image and a second segment of the image, wherein the first segment is processed using a first filter selected, based on depth information, to enable formation of a first density map, and the second segment is processed using a second filter selected, based on the depth information, to enable formation of a second density map, wherein the depth information indicates a first filter size of the first filter and a second filter size of the second filter;
combining, by the trained machine learning model, the first density map and the second density map to form a density map for the image; and
providing, by the trained machine learning model, an output based on the density map, the output being representative of an estimate of a quantity of objects in the image.

2. The method of claim 1 further comprising:
receiving, by the trained machine learning model, the image including a plurality of objects, wherein the image is segmented, based on the depth information, into at least the first segment and the second segment.

3. The method of claim 2, wherein the depth information is received from another machine learning model trained to output the depth information from the image.

4. The method of claim 1, wherein the trained machine learning model comprises a first convolutional network that includes the first filter, and a second convolutional network that includes the second filter, and wherein the first filter and the second filter each comprise a convolutional layer.

5. The method of claim 1, wherein the depth information indicates the location of the first segment and/or the second segment.

6. The method of claim 1, wherein the depth information indicates a first object size corresponding to a first distance range from a camera capturing the image and a second object size corresponding to a second distance range from the camera.

7. The method of claim 6, wherein the first filter filters a subset of the objects in the first segment based on the first object size and the second filter filters another subset of the objects in the second segment based on the second object size.

8. The method of 1 further comprising:
selecting, by the trained machine learning model and based on the depth information, the first filter size of the first filter and the second filter size of the second filter.

9. The method of claim 1, further comprising:
training, based on reference images, the machine learning model to learn generation of density maps.

10. The method of claim 1, wherein the plurality of objects include a plurality of people, a plurality of vehicles, and/or a crowd of people.

11. The method of claim 1, wherein the first density map estimates a density of objects in the first segment, wherein the second density map estimates a density of objects in the second segment, and wherein the density map estimates a density of objects in the image.

12. An apparatus comprising:
at least one processor; and
at least one memory including one or more programs which when executed with the at least one processor are configured to cause the apparatus to at least:
process, by a trained machine learning model, a first segment of an image and a second segment of the image, wherein the first segment is processed using a first filter selected, based on depth information, to enable formation of a first density map, and the second segment is processed using a second filter selected, based on the depth information, to enable formation of a second density map, wherein the depth information indicates a first filter size of the first filter and a second filter size of the second filter;
combine, by the trained machine learning model, the first density map and the second density map to form a density map for the image; and
provide, by the trained machine learning model, an output based on the density map, the output being representative of an estimate of a quantity of objects in the image.

13. The apparatus of claim 12, wherein the apparatus is further caused to at least:
receive, by the trained machine learning model, the image including a plurality of objects, wherein the image is segmented, based on the depth information, into at least the first segment and the second segment.

14. The apparatus of claim 13, wherein the depth information is received from another machine learning model trained to output the depth information from the image.

15. The apparatus of claim 12, wherein the trained machine learning model comprises a first convolutional network that includes the first filter, and a second convolutional network that includes the second filter, and wherein the first filter and the second filter each comprise a convolutional layer.

16. The apparatus of claim 12, wherein the depth information indicates the location of the first segment and/or the second segment.

17. The apparatus of claim 12, wherein the depth information indicates a first object size corresponding to a first distance range from a camera capturing the image and a second object size corresponding to a second distance range from the camera.

18. The apparatus of claim 17, wherein the first filter filters a subset of the objects in the first segment based on the first object size and the second filter filters another subset of the objects in the second segment based on the second object size.

19. The apparatus of 12, wherein the apparatus is further caused to at least:
select, by the trained machine learning model and based on the depth information, the first filter size of the first filter and the second filter size of the second filter.

20. A non-transitory computer-readable medium including program code which when executed causes operations comprising:
processing, by a trained machine learning model, a first segment of an image and a second segment of the image, wherein the first segment is processed using a first filter selected, based on depth information, to enable formation of a first density map, and the second segment is processed using a second filter selected, based on the depth information, to enable formation of a second density map, wherein the depth information indicates a first filter size of the first filter and a second filter size of the second filter;
combining, by the trained machine learning model, the first density map and the second density map to form a density map for the image; and
providing, by the trained machine learning model, an output based on the density map, the output being representative of an estimate of a quantity of objects in the image.

\* \* \* \* \*